Jan. 3, 1967  R. L. CAHN  3,295,635
AIR PASSENGER MEANS CONVEYOR
Filed Dec. 14, 1965  3 Sheets-Sheet 1
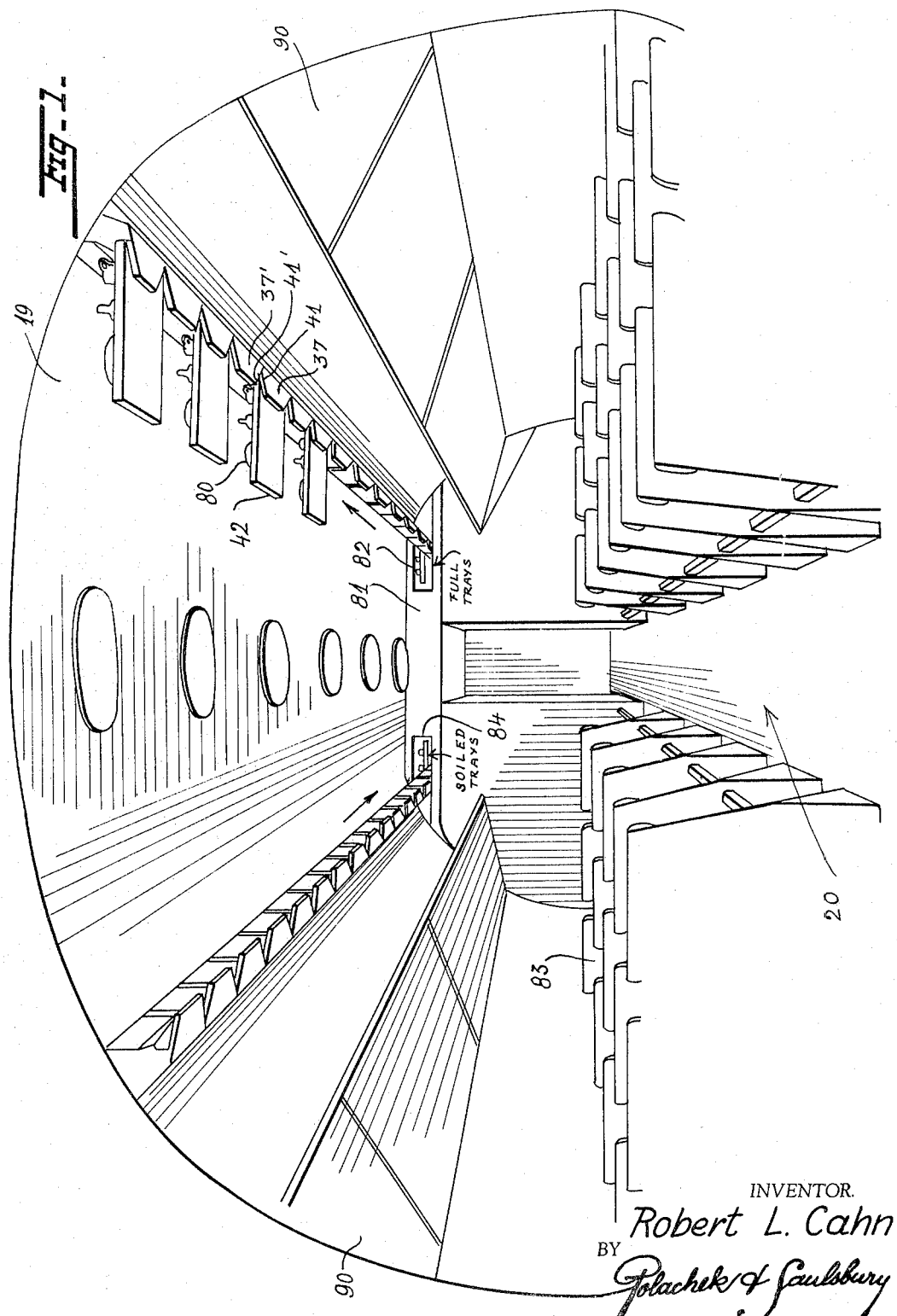
INVENTOR.
Robert L. Cahn
BY
Polachek & Saulsbury
ATTORNEYS

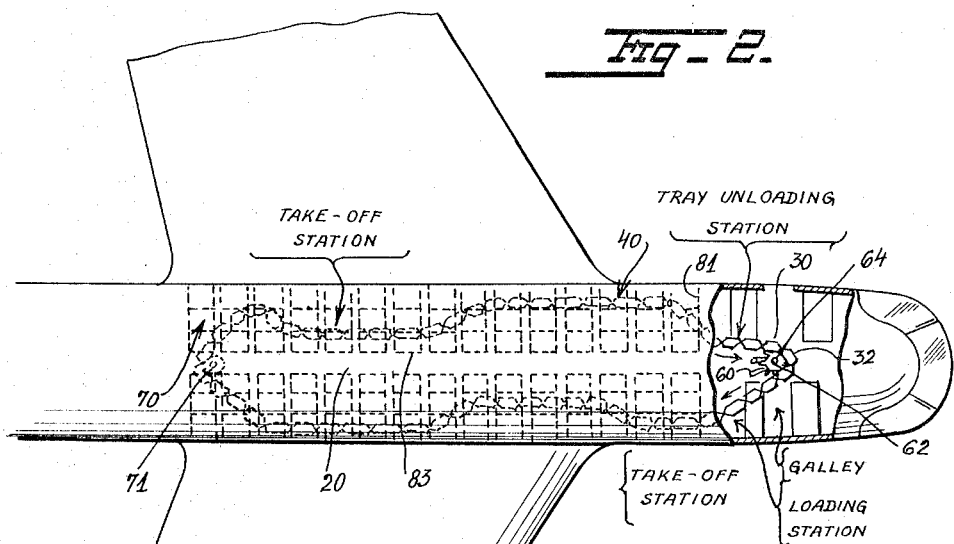
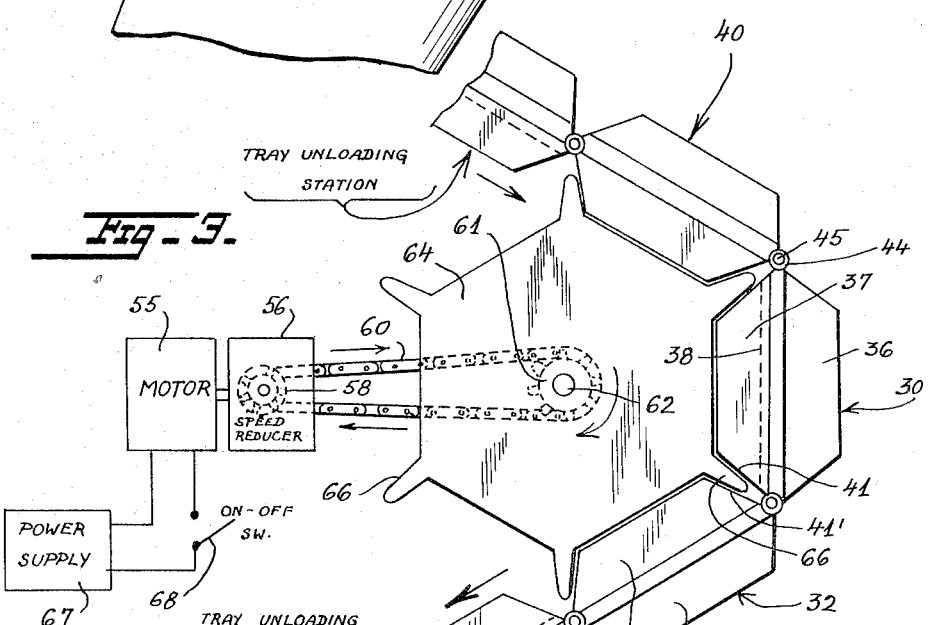

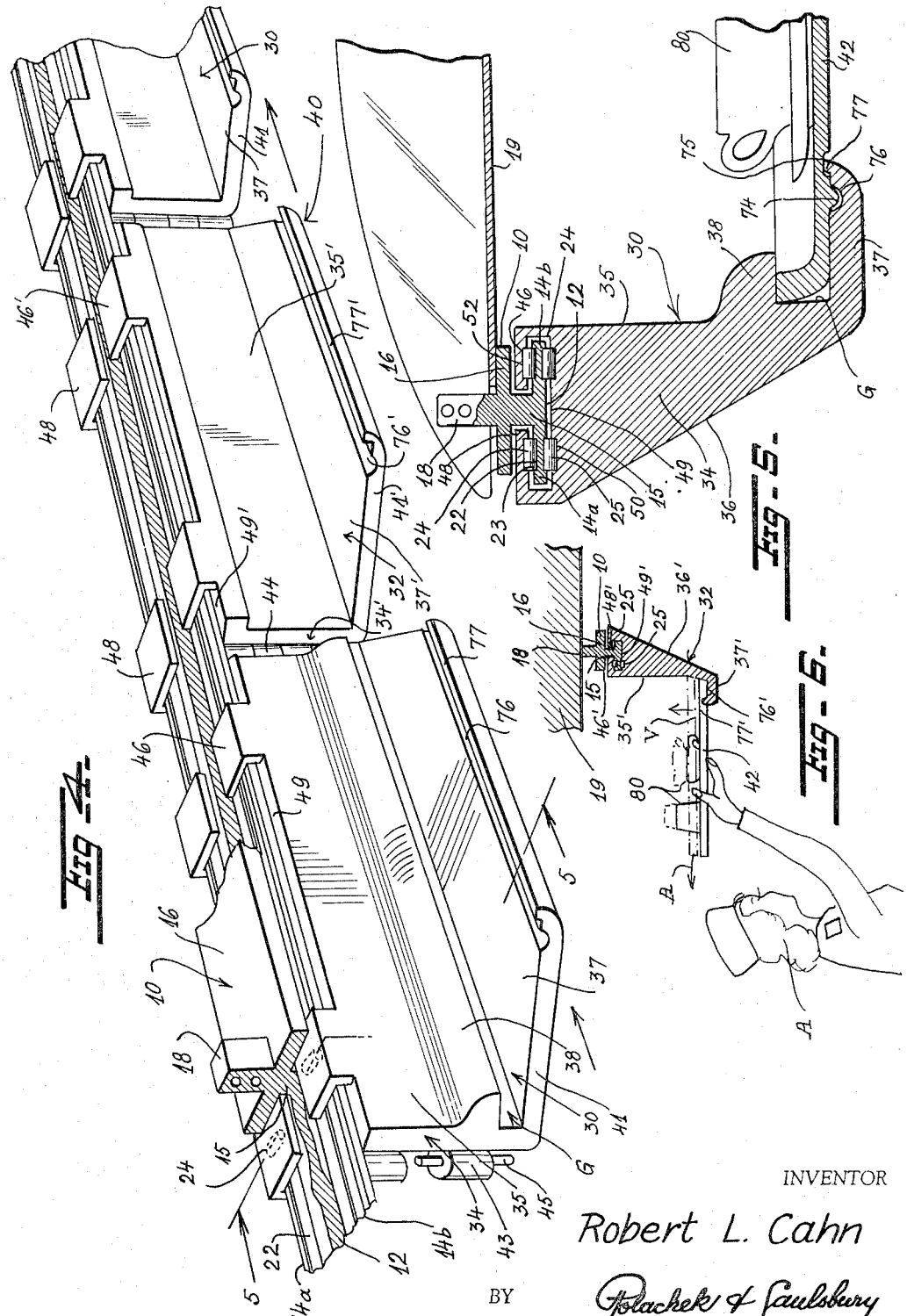

United States Patent Office 3,295,635
Patented Jan. 3, 1967

3,295,635
AIR PASSENGER MEALS CONVEYOR
Robert L. Cahn, 1 Mannetto Court,
Huntington, N.Y. 11743
Filed Dec. 14, 1965, Ser. No. 513,801
10 Claims. (Cl. 186—1)

This invention concerns an individual service tray delivery system.

The invention involves tray conveyor apparatus which can be installed in aircraft, railroad dining cars, steamship dining halls, lunchrooms, and the like. The invention provides selectively controlled continuous or intermittent movement of individual loaded trays containing food, drinking bar items, sales articles, gifts and related objects outbound from a kitchen, galley, bar, pantry, or other area of preparation, assembly or storage. The trays travel over a predetermined endless route to selected remote service or take-off areas or stations. Return takes place in like fashion of soiled trays, wrappings, empty containers, etc. to the location of origin of the trays.

The invention effects savings in time, space and labor in serving patrons, and insures orderly progressive delivery and return flow of trays. The invention serves to increase the efficiency of service personnel, stewards and stewardesses, waiters, etc. aboard aircraft, railroad cars and buses, and/or in restaurants, lunchrooms, mess halls and the like. The invention can be extended to use in libraries for carrying trays of books from storage stacks to delivery points where readers can be served. It can be used in department stores for delivering articles from stock to customer service counters. Numerous other applications of the invention are possible.

Basically the invention includes a stationary rail or beam which guides a chain of articulated, coupled tray supports around a closed loop. Power to drive the chain is provided by an electric motor which has a drive sprocket in direct, operative contact with tray supports at one end of the loop. At the other end of the lop is an idler sprocket rotatably engaged with tray supports thereat. Individual trays are in the tray supports in horizontal cantilever position. They move in a horizontal plane so that their contents cannot fall off. The tray supports are so constructed that service personnel can easily remove each tray while it remains in a horizontal position. Trays can easily and readily be refitted and engaged in the tray supports for return travel. When the conveyor apparatus is not in use all trays can be removed. The apparatus then presents a neat, inconspicuous, unobtrusive appearance.

It is therefore a principal object of the invention to provide a conveyor apparatus for loaded trays, comprising a stationary rail and an endless chain or moving depending tray supports carried by the rail, with a mechanical drive arrangement including a motor driven sprocket having cogs engaging and moving the tray supports loaded with trays.

Another object is to provide a conveyor apparatus as described, wherein the tray supports and trays move in an endless path around a closed loop.

A further object is to provide a conveyor apparatus as described, wherein the tray supports carry individual trays in horizontal cantilever position.

Still another object is to provide a conveyor apparatus as described, wherein the tray supports are constructed so that the trays remain securely engaged in the tray supports until removed by service personnel; mounting and removal of both loaded and soiled trays being easily and quickly accomplished.

Still another object is to provide a conveyor apparatus for trays in aircraft, dining cars, and the like, which apparatus is inconspicuous when not in use; and when the apparatus is in use the trays are carried in such manner that they do not interfere with movements of service personnel, patrons, or while facilitating and expediting rendering of service to patrons.

A further object is to provide conveyor apparatus as described which transports items in the same trays as are generally and conventionally used when serving patrons in aircraft, and other individualized public service facilities.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of an aircraft cabin looking forward, with a conveyor system embodying the invention shown installed therein.

FIG. 2 is a reduced bottom plan view partially schematic in form, illustrating an arrangement of conveyor apparatus in an aircraft.

FIG. 3 is an enlarged, fragmentary, bottom plan view partially schematic in form, illustrating part of a chain drive arrangement of conveyor apparatus embodying the invention.

FIG. 4 is an enlarged perspective view, with parts broken away, of a portion of conveyor apparatus according to the invention.

FIG. 5 is a further enlarged sectional view taken on line 5—5 of FIG. 4.

FIG. 6 is a reduced sectional view similar to a part of FIG. 5, illustrating the way in which a tray is removed from or replaced on the conveyor apparatus.

The conveyor apparatus includes a stationary I-beam or rail 10 best shown in FIGS. 4, 5 and 6. This rail has a flat bottom plate 12 with two flanges 14a, 14b extending laterally of a short, thick central vertical ridge 15. Ridge 15 integrally connects lower horizontal plate 12 with upper horizontal plate 16. Extending upwardly from upper late 16 at spaced points are support brackets 18. These brackets are secured to an overhead support such as the ceiling 19 of an aircraft cabin 20 shown in FIG. 1. At the upper side of each of flanges 14a, 14b is a groove 22. Another groove 23 is provided in the underside of flange 14a. These grooves receive cylindrical roller bearings 24 and 25 shown in FIG. 5. The roller bearings are provided for both tray supports 30 and tray guides 32, supported by the rail 10.

The rail 10 is arranged to define an endless horizontal looped structure. Endless chain 40 of tray supports and tray guides is movably carried by the rail 10; see FIG. 2. Each tray support and tray guide has a body 34 or 34' which is generally triangular in cross section with a straight side wall 35 or 35' facing inwardly of the plane of the chain and an inclined side wall 36 or 36' facing outwardly of the chain; see FIGS. 3–6. Each tray support and tray guide has a horizontal flange plate 37 or 37' extending laterally of the vertical side wall 35 or 35'. The tray supports 30 are formed with ridges 38 which extend laterally of the side walls 35 above flange plates 37. Between the ridges 38 and flange plates 37 are defined grooves or channels G which receive rimmed ends of trays 42 as clearly shown in FIG. 5. The ridges 38 are omitted from the tray guides 32; see FIGS. 4, 5 and 6. Opposite ends 41, 41' of the flange plates 37 and 37' of both the tray guides and tray supports are formed with acute angles of about 30°. Opposite ends of the bodies 34 and 34' are formed with interfitting axially vertical cylindrical hinge eyes 43, 44 which receive hinge pins 45; see FIGS. 3 and 4.

At their upper ends, the tray supports and tray guides have horizontal inner flanges 46, 46' extending outwardly and horizontal outer flanges 48, 48' extending inwardly coplanar with each other and spaced from the tops 49, 49' of the bodies 34, 34'. In the body tops are recesses 50 which rotatably receive lower cylindrical roller bearings 25. In the undersides of flanges 46, 46' and 48, 48' are recesses 52 which rotatably receive roller bearings 24. By the arrangement described, there is defined an endless chain 40 of tray supports alternating with tray guides, movable freely and carried by the rail 10 whose flanges 14a, 14b extend underneath the flanges 46, 46' and 48, 48' of the tray supports and tray guides 30, 32 while flanges of plate 16 overlay flanges 46, 46', 48, 48'.

The drive mechanism for the chain 40 is shown in FIGS. 2 and 3. This mechanism includes an electric motor 55 which can be supported from the ceiling of the aircraft near the forward end loops of the chain and rail.

The motor drives a speed reducing gear train 56 having a final drive sprocket 58 on which is entrained an endless drive chain 60. The chain extends horizontally and is engaged on a sprocket 61 carried by a shft 62 journaled at the ceiling of the aircraft in bearing means (not shown). Secured to the shaft 62 underneath the sprocket 61 is a large hexagonal sprocket 64 having six tapered corner cogs 66. These cogs fit in turn between the acute angled ends 41, 41' of adjacent tray supports and tray guides as clearly shown in FIG. 3. The motor is energized by suitable power supply 67 in circuit with an ON-OFF switch 68. The other end loop of the chain 40 is engaged on a hexagonal idler sprocket 70 carried by a shaft 71 journaled in bearing means at the ceiling of the aircraft. When the motor is energized, the chain 40 of tray supports and tray guides is driven continuously but at slow speed. When the switch 68 is alternately and selectively opened and closed the chain drive is stopped and started respectively under control of the service personnel operating the apparatus.

The sides of the chain 40 and rail 10 are not necessarily straight but they can be. As shown clearly in FIG. 2 the chain portions 40a and 40b are diverted inwardly of the chain in the cabin 20 to facilitate removal of trays from the conveyor by service personnel.

Each of the trays 42 may be formed with an outer projecting ridge 74 at its underside and an adjacent groove 75; see FIG. 5. The ridge 74 will engage in groove 76 of flange plate 37 while groove 75 will receive upwardly extending lip 77 formed at the free end of flange plate 37; see FIG. 5. Flange plates 37' are formed with grooves 76' and lips 77' corresponding to grooves 75 and lips 77, to receive ridges 74 and grooves 75 of the trays. By this arrangement, the trays cannot slip horizontally off the tray supports.

FIG. 6 illustrates how a tray 42 loaded with food containers 80 or other articles can be removed conveniently, quickly and safely from the apparatus. The service operator or attendant A grasps at one end a tray which is being carried by one of the tray supports. The attendant holds the tray stationary while the driven chain 40 continues to move. The tray support 30 slides horizontally clear of the tray and the flange 37' of the adjacent following tray guide 32 moves under the tray to guide and support the tray. The outer edge of the tray is now clear of ridge 38 of the cleared tray support 30 and the tray rests on flange plate 37' of tray guide 32 as shown in FIG. 6. The attendant can now lift the loaded tray vertically upward as indicated by arrow V to clear the tray from groove 76' and lip 77'. Then the attendant can draw the elevated tray inwardly horizontally clear of the tray guide 32 as indicated by arrow H.

FIG. 2 indicates that a galley is located at the forward end of the aircraft. The chain moves generally clockwise around sprocket 58. A loading station is located in the galley just forward of a partition 81 at the front of cabin 20. The loaded trays pass through a right rectangular opening 82 in partition 81, shown in FIG. 1 into the cabin. It will be noted that the major portions of the trays 42 extend laterally inwardly of the chain and cabin in cantilever fashion over seats 83 in the cabin. Soiled trays pass through left rectangular opening 84 in partition 81. Just behind the partition is a tray unloading station as indicated in FIG. 2. Although two tray take-off stations are specifically indicated in FIG. 2, it will be understood that trays can be removed and replaced at any point around the chain.

Once the trays are in place they cannot be accidentally displaced. They must be removed in the operating sequence described above: i.e., by shifting horizontally longitudinally of the chain to a tray guide; then lifting from the tray guide. If desired, supplementary locking means of various kinds can be provided to hold the trays on the tray supports.

The apparatus is installed close to the ceiling 19 of the aircraft as shown in FIG. 1, above the usual luggage racks 90, where the apparatus is out of the way.

If desired the tray supports 30 and/or tray guides 32 can be constructed so that the trays can be lowered at will by the attendants prior to disengaging them from the tray supports.

Although the invention has been explained in connection with an installation in an aircraft, it will be apparent that the invention is of general application and can be used as a tray delivery and return conveyor system installed in any location for any type of service.

While I have illustrated and described the preferred embodiments of my invention, it is to be understood that I do not limit myself to the precise construction here disclosed and that various changes and modifications may be made within the scope of the invention as defined in the appended claims.

What is claimed is:

1. A tray delivery and return conveyor apparatus, comprising an endless horizontal rail, said rail being I-shaped in cross section with upper and lower spaced plates having laterally extending first flanges; a continuous chain of tray supports and tray guides each of said tray supports and tray guides having a vertical body provided with second flanges at its upper end slidably interfitting between the first flanges of the spaced plates of the rail, so that the rail slidably supports the chain of tray supports and guides, each of the tray supports and guides having a laterally extending flange plate for removably supporting a tray; hinge means pivotally connecting adjacent ends of the tray supports and tray guides, said ends of the tray supports and tray guides being tapered in form; and drive means for moving said chain slidably around underneath the rail, said drive means comprising a pair of polygonal drive sprockets located respectively at opposite looped ends of the chain, each sprocket having straight edges contacting edges of flange plates of the tray supports and tray guides at a looped end of the chain, each sprocket having corner tapered cogs engageable between adjacent tray supports and tray guides at a looped end of the chain, and motor means operatively connected to one of the sprockets and rotatably driving the same so that the chain of tray supports and tray guides moves continuously around underneath the rail.

2. A tray delivery and return conveyor apparatus as recited in claim 1, further comprising roller bearing at the lower plate of the rail and said second flanges to facilitate easy sliding of the tray guides and tray guides along the rail.

3. A tray delivery and return conveyor apparatus as recited in claim 1, wherein the bodies of the tray supports are provided with laterally extending third flanges overlaying the flange plates thereof to define grooves for receiving rimmed edges of trays, so that the trays extend horizontally outward in cantilever fashion from the tray supports.

4. A tray delivery and return conveyor apparatus as recited in claim 3, wherein the flange plates of the tray supports have grooves and lips interfitting with mating ridges and grooves respectively of the trays so that the trays are prevented from sliding laterally horizontally off the flange plates of the tray supports.

5. A tray delivery and return conveyor apparatus as recited in claim 4, wherein the tray guides alternate with the tray supports, said tray guides having other grooves and lips interfitting with the mating ridges and grooves respectively of the trays so that when the trays carried by the tray supports are held stationary while the chain moves longitudinally of the trays, next succeeding tray guides slide underneath the trays, said third flanges of the tray supports being omitted from the tray guides so that the trays then resting on the tray guides can be lifted vertically off from the flange plates of the tray guides.

6. A tray delivery and conveyor apparatus as recited in claim 2, wherein the bodies of the tray supports are provided with laterally extending third flanges overlaying the flange plates thereof to define grooves for receiving rimmed edges of trays, so that the trays extend horizontally outward in cantilever fashion from the tray supports.

7. A tray delivery and conveyor apparatus as recited in claim 6, wherein the flange plates of the tray supports have grooves and lips interfitting with mating ridges and grooves respectively of the trays, so that the trays are prevented from sliding laterally horizontally off the flange plates of the tray supports.

8. A tray delivery and conveyor apparatus as recited in claim 7, wherein the tray guides alternate with the tray supports, said tray guides having other grooves and lips interfitting with the mating ridges and grooves respectively of the trays so that when the trays carried by the tray supports are held stationary while the chain moves longitudinally of the trays, next succeeding tray guides slide underneath the trays, said third flanges of the tray supports being omitted from the tray guides so that the trays then resting on the tray guides can be lifted vertically off from the flange plates of the tray guides.

9. A tray delivery and conveyor apparatus as recited in claim 1, wherein said chain has portions thereof extending laterally inward of the other portions the chain to facilitate removal of the trays from the chain of tray supports and tray guides.

10. A tray delivery and conveyor apparatus as recited in claim 5, wherein said chain has portions thereof extending laterally inward of the other portions the chain to facilitate removal of the trays from the chain of tray supports and tray guides.

References Cited by the Examiner
UNITED STATES PATENTS

| | | | |
|---|---|---|---|
| 3,102,607 | 9/1963 | Roberts | 186—1 |
| 3,202,259 | 8/1965 | Orwin | 198—177 |

EVON C. BLUNK, *Primary Examiner.*

H. C. HORNSBY, *Assistant Examiner.*